No. 825,399. PATENTED JULY 10, 1906.
F. LAMBERT.
FLUID METER.
APPLICATION FILED APR. 13, 1904.

Witnesses
Mabelle F. Lake
Herbert G. Whipple

Inventor
Frank Lambert
By his Attorney
Edith J. Griswold

THE NORRIS PETERS CO., WASHINGTON, D. C.

UNITED STATES PATENT OFFICE.

FRANK LAMBERT, OF NEW YORK, N. Y.

FLUID-METER.

No. 825,399.　　　Specification of Letters Patent.　　　Patented July 10, 1906.

Application filed April 13, 1904. Serial No. 203,029.

*To all whom it may concern:*

Be it known that I, FRANK LAMBERT, a citizen of the United States, and a resident of New York city, borough of Brooklyn, Kings county, State of New York, have invented Improvements in Fluid-Meters, of which the following is a specification.

My present invention relates to fluid-meters, and has for its main object to simplify the construction of frost-proof meters and to prevent leakage of the meter in case of undue internal pressure or of freezing and subsequent thawing. I accomplish this object by making a pressure-casing open at one end and providing a closing-piece and means for maintaining a fluid-pressure joint between said pressure-casing and said closing-piece in various relative positions thereof, said means acting at the same time to hold the parts in normal relative positions.

Figure 1:
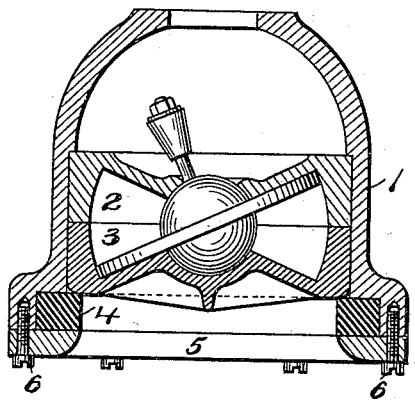
Figure 2:
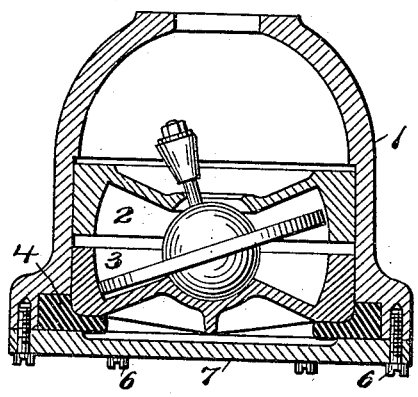
Figure 3:
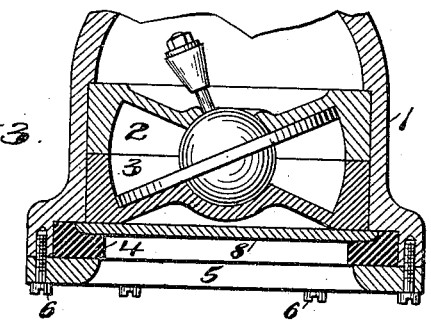

In the accompanying drawings, Figures 1 and 2 are central sectional elevations of a meter made according to my present invention, Fig. 1 showing the parts in normal positions and Fig. 2 showing them out of normal positions, Fig. 2 also showing a slight modification in construction. Fig. 3 is a view similar to Fig. 1, showing a further slight modification.

Referring to Figs. 1 and 2, the closing-piece for the pressure-casing 1 is here shown as the usual measuring-chamber of a disk meter, which chamber may be in any number of sections, the present construction representing two sections 2 and 3. This closing-piece, measuring-chamber, or internal casing 2 3 is normally held in a certain relative position in the external or pressure casing 1 by a device comprising, essentially, a thick resilient gasket 4 or the like and a rigid piece (or pieces) 5, secured to the casing, so as to suitably compress the gasket 4 against faces of the pressure-casing and closing-piece, where they meet with sufficient compression to hold the closing-piece in normal position under the normal internal pressure to which the meter is to be subjected. As shown in Fig. 1, the rigid piece is shown in the form of a ring 5, secured to the casing 1 by screws 6. As shown in Fig. 2, the rigid piece is in the form of a plate 7, which may be desired for better protection of the rubber or similar gasket 4.

From the foregoing it will be evident that if the closing-piece or internal chamber is forced out of normal position by an internal pressure that will overcome the resistance of the compressed gasket 4 the closing-piece will assume a position such as shown, for instance, in Fig. 2, that will tend to compress the gasket 4 at the joint more than originally compressed, and thus maintain a fluid-tight closure of the pressure-casing in various relative positions of the said closing-piece.

Fig. 3 represents the closing-piece in the form of a plate 8, the gasket 4 holding the said plate against the face of the pressure-casing around the opening, upon which plate any form of an internal casing may rest or be secured.

In water-meters it frequently happens that the water in the meter will partially freeze, so that the closing-piece may be moved out of normal position, according to degrees of freezing, or the internal pressure may exceed the normal in varying amounts, and it will be readily understood that under various conditions the gasket 4 will return the parts to normal position in resuming its own normal shape when the pressure again becomes normal.

I claim as my invention—

1. In a fluid-meter, the combination of a pressure-casing, and an internal casing therein, with means for holding the said internal casing in normal position relative to the pressure-casing, said means being provided with a thick resilient gasket that will permit the internal casing to move out of normal position under undue internal pressure, and maintain a fluid-tight joint at the closure of the pressure-casing in various relative positions of the said parts.

2. In a fluid-meter, the combination of a pressure-casing, and an internal casing closing said pressure-casing, with means for holding the said internal casing in normal position relative to the pressure-casing, said means being provided with a thick resilient gasket that will permit the internal casing to move out of normal position under undue internal pressure, and will maintain a fluid-tight joint between the internal casing and the pressure-casing in various relative positions of said parts.

3. In a fluid-meter, the combination of a pressure-casing, and a closing-piece therefor, with means for holding said closing-piece in normal position relative to the pressure-casing, said means provided with a thick resilient gasket that will permit the closing-piece to move out of normal position under undue internal pressure, and return it to its normal position when normal internal pressure is resumed, and will maintain a fluid-pressure joint at the closure of the pressure-casing in various relative positions of the parts.

In testimony whereof I have signed my name to this specification in the presence of two subscribing witnesses.

FRANK LAMBERT.

Witnesses:
EDITH J. GRISWOLD,
MABELLE F. LAKE.